US006829476B1

(12) United States Patent
Gelbein

(10) Patent No.: US 6,829,476 B1
(45) Date of Patent: Dec. 7, 2004

(54) PAGER-BASED GAS VALVE CONTROLLER

(76) Inventor: Lawrence J. Gelbein, 41 Alice Rd., West Islip, NY (US) 11795

(*) Notice: Subject to any disclaimer, the term of this patent is extended or adjusted under 35 U.S.C. 154(b) by 794 days.

(21) Appl. No.: 09/667,351

(22) Filed: Sep. 22, 2000

Related U.S. Application Data

(63) Continuation-in-part of application No. 09/010,278, filed on Jan. 21, 1998.
(60) Provisional application No. 60/036,275, filed on Jan. 24, 1997.

(51) Int. Cl.[7] ........................ H04M 3/00; H04Q 7/30
(52) U.S. Cl. ..................... 455/420; 455/352; 455/458; 340/7.1; 340/7.39
(58) Field of Search ............................ 455/3.03, 3.04, 455/419–420, 352–354, 458; 340/7.1, 7.38, 825.22, 7.39

(56) References Cited

U.S. PATENT DOCUMENTS

| | | | | |
|---|---|---|---|---|
| 3,114,243 | A | | 12/1963 | Winters |
| 3,372,899 | A | | 3/1968 | McPherson |
| 3,614,326 | A | | 10/1971 | Cameron |
| 3,653,595 | A | | 4/1972 | Greengard, Jr. et al. |
| 3,726,477 | A | | 4/1973 | Shapiro |
| 3,783,193 | A | | 1/1974 | Lee |
| 3,859,462 | A | | 1/1975 | Saxon |
| 4,031,963 | A | * | 6/1977 | Poggemiller et al. .......... 172/4 |
| 4,146,049 | A | | 3/1979 | Kruse et al. |
| 4,185,650 | A | | 1/1980 | Neves et al. |
| 4,206,444 | A | | 6/1980 | Ferlan |
| 4,208,630 | A | | 6/1980 | Martinez |
| 4,209,131 | A | | 6/1980 | Barash et al. |
| 4,266,097 | A | | 5/1981 | Cannon et al. |
| 4,273,961 | A | | 6/1981 | Blank et al. |
| 4,322,842 | A | | 3/1982 | Martinez |
| 4,396,149 | A | | 8/1983 | Hirsch |
| 4,473,821 | A | | 9/1984 | Yang et al. |
| 4,598,286 | A | | 7/1986 | Miller et al. |
| 4,626,984 | A | | 12/1986 | Unruh et al. |
| 4,628,306 | A | | 12/1986 | Root |
| 4,691,341 | A | | 9/1987 | Knoble et al. |
| 4,724,334 | A | | 2/1988 | Melek |
| 4,806,906 | A | | 2/1989 | Oda et al. |
| 4,893,351 | A | | 1/1990 | McKee et al. |

(List continued on next page.)

FOREIGN PATENT DOCUMENTS

| | | |
|---|---|---|
| EP | 95118844.0 | 11/1995 |
| EP | 0716553 | 6/1996 |
| WO | PCT/GB94/01199 | 6/1994 |

OTHER PUBLICATIONS

Fisher Pierce Catalogue, Powerflex VHF Radio Capacitor Control Switch, 1994.
Page Tap Model #PT8–OC Catalogue, Apr. 9, 1996.
Page Tap TT4 Remote Control Switch Catalogue, Apr. 9, 1996.
Page Tap ISD Catalogue.

*Primary Examiner*—Simon Nguyen
(74) *Attorney, Agent, or Firm*—Dilworth & Barrese, LLP

(57) ABSTRACT

A pager-based controller including at least one pager configured to receive a signal from a remote location, the at least one pager being further configured to provide an output to control an on-off state of a valve actuator; a valve opening circuit to provide an output to locally control an on-off state of a valve actuator; a DC power source for supplying a required DC voltage to electrical components within the pager-based controller; a relay electrically connected to the at least one pager and the valve opening circuit; an isolation circuit electrically connected to the at least one pager and the relay, the isolation circuit configured to receive the output from the at least one pager and the valve opening circuit and supply a corresponding signal to the relay; the relay configured to receive the corresponding signal and control the valve actuator accordingly in response.

19 Claims, 4 Drawing Sheets

U.S. PATENT DOCUMENTS

| | | | | | |
|---|---|---|---|---|---|
| 4,935,736 | A | | 6/1990 | Meierdierck | |
| 4,962,522 | A | * | 10/1990 | Marian | 340/7.1 |
| 4,996,703 | A | | 2/1991 | Gray | |
| 5,012,233 | A | | 4/1991 | Poulsen, Jr. | |
| 5,043,721 | A | | 8/1991 | May | |
| 5,061,921 | A | | 10/1991 | Lesko et al. | |
| 5,070,329 | A | | 12/1991 | Jasinaki | |
| 5,148,158 | A | | 9/1992 | Shah | |
| 5,153,582 | A | | 10/1992 | Davis | |
| 5,175,758 | A | | 12/1992 | Levanto et al. | |
| 5,208,855 | A | | 5/1993 | Marian | |
| 5,281,962 | A | | 1/1994 | Vanden Heuvel et al. | |
| 5,291,193 | A | | 3/1994 | Isobe et al. | |
| 5,337,044 | A | | 8/1994 | Folger et al. | |
| 5,359,318 | A | | 10/1994 | Asai et al. | |
| 5,392,452 | A | | 2/1995 | Davis | |
| 5,394,560 | A | | 2/1995 | Kane | |
| 5,455,572 | A | | 10/1995 | Cannon et al. | |
| 5,469,133 | A | | 11/1995 | Hensler et al. | |
| 5,539,633 | A | * | 7/1996 | Hildebrand et al. | 700/32 |
| 5,608,655 | A | * | 3/1997 | Moughanni et al. | 340/7.1 |
| 5,661,468 | A | * | 8/1997 | Marcoux | 340/7.1 |
| 5,693,952 | A | | 12/1997 | Cox | |
| 5,790,036 | A | | 8/1998 | Fisher et al. | |
| 5,872,505 | A | | 2/1999 | Wicks et al. | |
| 5,881,364 | A | | 3/1999 | Higuchi | |
| 5,898,384 | A | * | 4/1999 | Alt et al. | 340/825.36 |
| 5,923,271 | A | * | 7/1999 | Santini | 341/20 |
| 6,374,101 | B1 | * | 4/2002 | Gelbien | 455/420 |

* cited by examiner

PAGER-BASED GAS VALVE CONTROLLER

CROSS REFERENCE TO RELATED APPLICATION

This application is a continuation-in-part and claims the benefit of U.S. Utility application Ser. No. 09/010,278, filed Jan. 21, 1998, and incorporated by reference herein, which claims the benefit of 60/036,275 filed Jan. 24, 1997.

BACKGROUND OF THE INVENTION

1. Field of the Invention

The present disclosure relates generally to remote control systems for remotely controlling electrical equipment. More particularly, this disclosure relates to a controller which receives pager signals from a pager network to control electrical/electronic equipment, including electronic gas valve actuators.

2. Description of the Related Art

Remote control systems which are capable of generating and transmitting control signals to remotely control electronic equipment are known in the prior art. Electric utility companies, for example, typically utilize a private remote control system with a private radio network to remotely control on/off switching of capacitor banks in accordance with daily electric power requirements. Such systems, however, are costly in that they require implementation and maintenance of the private radio network. In addition, their utility is generally limited to a narrow geographical region.

Hence, a need exists for a generally inexpensive remote control system which uses the public system telephone network (PSTN) to transmit control signals over a wide geographical region to remotely control equipment.

SUMMARY OF THE INVENTION

The present invention relates to a remote control system in which RF pager signals transmitted by means of a wide area pager network, are received by a pager-based controller to control electrical or electronic equipment. A human operator or automated computer at a telecommunication station connected to the PSTN, initiates the transmission of RF pager signals via the pager network to the pager-based controller at the remote equipment site. In a preferred embodiment, the pager-based controller includes at least one conventional pocket pager which has been modified by having its vibrator or other indicator removed. Each time the pocket pager receives a page, it outputs a control voltage normally used to drive the vibrator. This control voltage is used to change the switching state of a relay within the controller to thereby control the on-off state of external electronics connected to the relay such as gas valve actuators.

In an exemplary embodiment, at least one pager is employed within the controller having a pager (telecommunication) number. The pager is paged to set the valve actuator to a CLOSED state, while a separate valve opening circuit is activated locally to set the valve activator to an open state. The relay switches power to the valve actuator. As such, the valve actuator can be switched closed merely by the remote operator or automated computer dialing the telecommunication number of the respective pager as allocated by the PSTN and pager network. The valve actuator is then closed locally.

A pager-based controller is provided which includes at least one pager configured to receive a signal from a remote location, the at least one pager being further configured to provide an output to close a valve; a valve opening circuit to provide an output to open the valve; a DC power source supplying DC voltage to electrical components within the pager-based controller; a relay electrically connected to the at least one pager and the valve opening circuit.

A method of remotely controlling an electronic device is also provided which includes the steps of transmitting a first pager signal from a pager network to a pager-based controller having at least one pager therein; outputting a first control voltage from the at least one pager controller to change a switching state of a relay within the pager-based controller to thereby control a valve actuator which is electrically connected to the relay; and locally initiating a second control voltage to change the switching state of the relay within the controller to control a valve actuator to a state which is opposite that which was caused by the first control voltage.

Advantageously, the use of conventional pocket pagers within the controller requires minimal set-up and maintenance costs and provides a reliable method of controlling the capacitor bank via the use of the pager network. Set-up costs are minimal since a customized private radio network for the transmission of control signals is not necessary.

BRIEF DESCRIPTION OF THE DRAWINGS

For a better understanding of the invention, reference is made to the following description of exemplary embodiments thereof, and to the accompanying drawings, wherein.

DETAILED DESCRIPTION OF THE PREFERRED EMBODIMENTS

Figure 1:
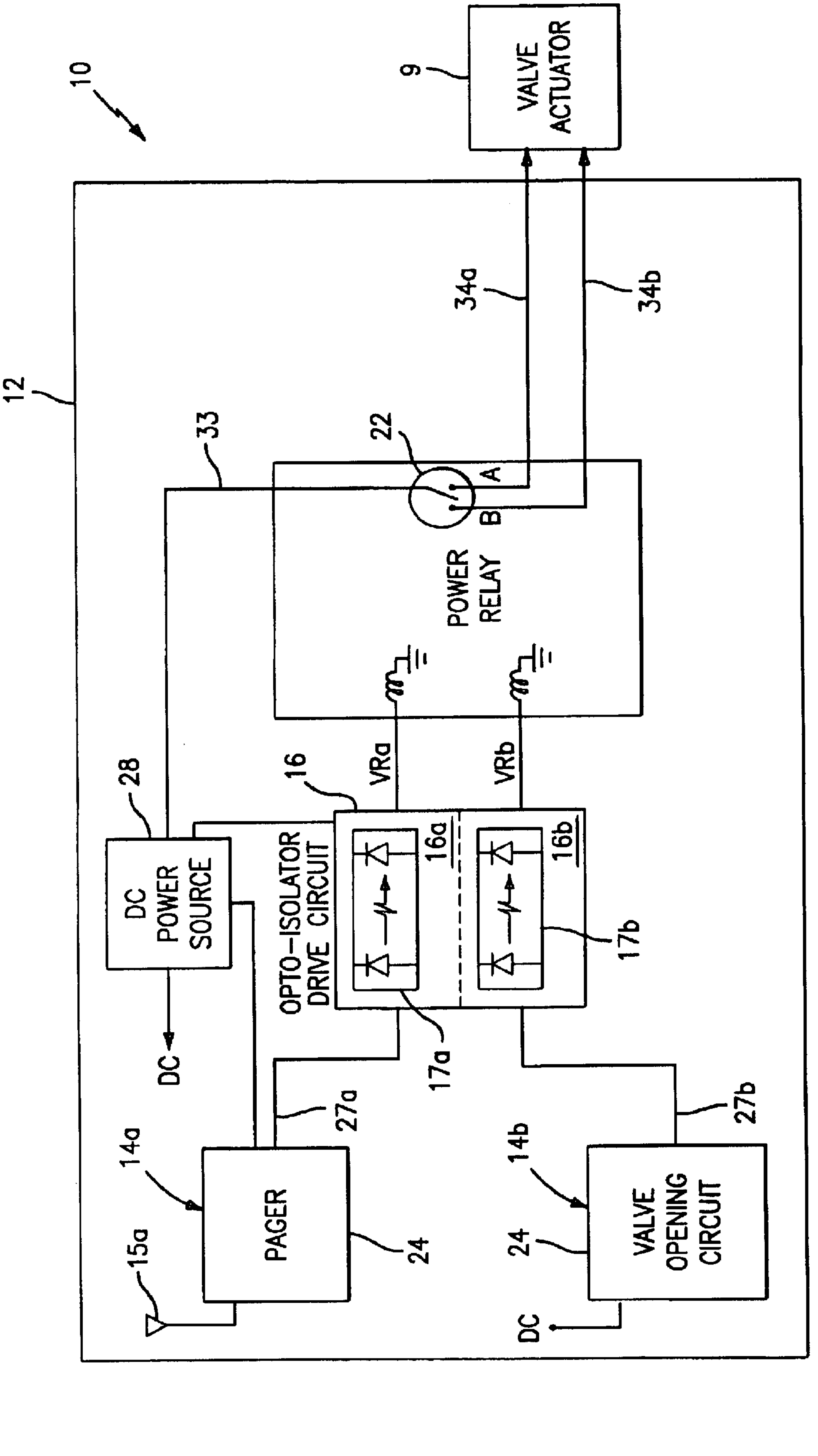
FIG. 1 is a block diagram of a pager-based controller in accordance with the present invention.

FIG. 1 shows a simplified block diagram of the internal components of a pager-based controller 10 in accordance with the present invention. Controller 10 includes a pocket pager 14*a* which receives paging signals from a pager network. Pager 14*a* is registered with the pager network and is allocated a pager (telephone) number. Each time a remote operator or automated computer dials the respective pager number through the PSTN, the pager 14*a* receives the page signal via the PSTN and pager network. Whenever the page signal is received, the pager 14*a* outputs a control signal to an opto-isolator drive circuit 16*a*, which in turn changes a switching state of a power relay 20. A valve opening circuit 14*b* operates to switch the power relay 20 to an OFF state via opto-isolator drive circuit 16*b*, as described further with reference to FIG. 1A.

In a preferred embodiment, the switching of power relay 20 is used to switch an external gas valve actuator on or off. However, it is to be understood that pager-based controller 10 may alternatively be employed to control other types of electrical or electronic equipment, such as valve actuators for controlling the supply of water or oil. In addition, while it is preferable to employ a single pager 14, multiple pagers could be alternatively utilized within each controller 10.

Controller 10 is preferably embodied as a small portable unit deployable in the field, with a housing 12 to environmentally protect the circuitry therein. Alternatively, the circuitry may be entirely encased in a protective material. Pocket pager 14*a* may be a modified conventional pager (e.g., Motorola Bravo, Bravo Plus or Advisor pagers) and can be maintained within its original housing 24 to simplify mounting within the controller 10. Also, electromagnetic shielding may be used along the inner surface of the pager housing 24 to reduce electromagnetic interference (EMI) susceptibility. The pocket pager typically operates in a one-way pager system, although two-way pagers can also be used. Pager 14*a* is modified from its commercial design simply by having its batteries and vibrator removed. Conventional pagers include a vibrator which vibrates whenever a page is received to convey vibrational movement to the person wearing the pager. Vibrating action is typically selected by the user via a mode switch on the pager. When vibrating action is selected, the audio output of the pager is deactivated such that the user can effectively receive pages without an accompanying (disturbing) audible tone.

DC power is preferably supplied to controller 10 via a DC source 28, such as batteries or solar power. Here, DC is preferable since it meets the requirement for "intrinsically safe" control of gas equipment. This DC voltage is used to power the electronics within controller 10, including pagers 14*a* (which has its batteries removed) and valve opening circuit 14*b*. The DC power supply may supply multiple voltages as needed, or multiple DC power supplies may be used. As an alternative, an alternative energy source known to one having ordinary skill in the art, such as an AC line voltage and converter, could be used to power the various components.

When a page signal is transmitted to controller 10, pager 14*a* receives the page and responds by outputting the control voltage normally used to drive the respective vibrator. The control voltage is supplied to an opto-isolator drive circuit 16*a* on line 27*a*. The valve opening circuit 24 provides a local control output to opto-isolator drive circuit 16*b* on line 27*b*. Drive circuit 16 includes two portions, 16*a* and 16*b*, each including respective opto-isolator electronics 17*a* or 17*b*. Drive circuit 16 responds to the control voltage on line 27*a* or 27*b* by outputting a respective output voltage VRa or VRb at an appropriate level to power relay 20. When one of these voltages is applied to relay 20, the switching state of the relay changes.

The power relay 20 includes a relay switch 22 that activates one of two positions A or B corresponding to an energized or de-energized state of the gas valve actuator, until electrically reset by a new application of the voltage VRa or VRb from drive circuit 16. The switch 22 input is connected to the DC power source on line 33. The switch output connects to either line 34*a* or 34*b* which sends a "close" or "open" command, respectively, to valve actuator 9. Valve actuator 9 is preferably a magnetically latching type valve actuator and remains in a latched state. As such, when power relay 20 changes switching state, the operational state of the valve actuator is correspondingly changed. Alternatively, the relay may be a latching type relay to provide a maintained closure to the valve actuator.

The opto-isolators within drive circuit 16 operate to isolate the pager 14*a* and valve opening circuit 14*b* from the relatively high voltage/current levels at the power relay 20. The drive circuit 16 thus prevents voltage spikes from reaching the pager 14*a* during operation of the external electrical device. A fuse may also be provided on lines 33 and/or 34*a*, 34*b* to avoid damage to the relay 20 if current is excessively high.

DC power source 28 supplies DC voltage to pager 14*a*, valve opening circuit 14*b* and drive circuit 16. Typically, the energy requirement of each pager is 80 mA at 1.5 VDC.

Each controller 10 may include a heater and fan (not shown) within the enclosure to maintain the pagers and other electronics within a proper operating temperature range.

The present invention is particularly advantageous for use by utility companies supplying natural gas to homes. In such a case, the utility company may actuate the gas valve, as described above, remotely via the pager 14*a*. Controlling the gas valve via pager 14*a* effectively shuts off the gas supply to a home or business. The present invention therefore provides a means to shut off the gas supply remotely from a utility office, for example. This represents a labor savings to the utility, and represents an advantageous safety feature in that potential safety hazards can be eliminated without risk to personnel.

Continuing the exemplary application described above, it is further advantageous to provide a means for the utility to reset the valve locally. While remote shut off of gas service is preferable, turning the gas service back on remotely presents obvious safety concerns. Therefore, it is more advantageous to turn the gas service back on locally, on-premises, preferably using a safe and reliable means.

Figure 1A:
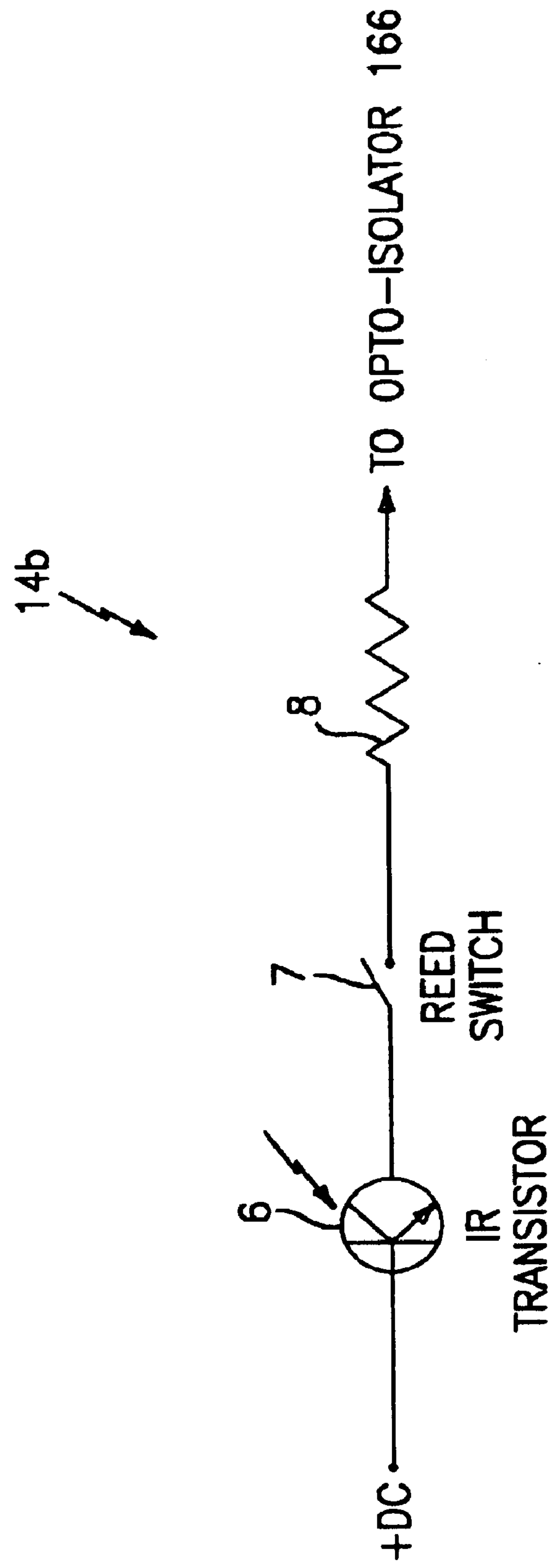
FIG. 1A is a schematic diagram illustrating a valve opening circuit in accordance with a preferred embodiment of the present invention.

Referring to FIG. 1A, a simplified schematic diagram of a preferred embodiment of the valve opening circuit 14*b* is shown. The valve opening circuit 14*b* preferably includes an infra-red (IR) transistor 6, a magnetic reed switch 7, and a current limiting resistor 8. In operation, a pulse of current from the DC power supply source causes relay 20 to change state, thereby gas valve actuator 9 to open the valve. The current source is limited by current limiting resistor 8 and isolated by opto-isolator 16*b*. Both the IR transistor 6 and the magnetic reed switch must be in a conductive state for at least a temporary period to provide a pulse to power relay 20. Preferably, two different technologies are used to increase reliability and safety by preventing false trigers of the relay. Here, a technician, or any trained user, must apply both an IR source and a magnetic source to the circuit simultaneously to complete the circuit, thereby triggering power relay 20. Both IR and magnetic sources are preferable to limit any possibility of sparking. A magnetic reed switch is also preferable, since it is encapsulated in a glass tube, limiting the possibility of sparking. Limiting the possibility of sparking is preferable due to the potential for igniting the near-by gas supply.

Accordingly, the valve opening circuit of FIG. 1A provides a safe and reliable means to control the gas valve actuator 9 to turn the gas supply on locally. While an IR transistor 6 and reed switch are employed in the preferred embodiment, it is understood that many variations of the valve opening circuit may be made by one having ordinary skill in the art. For example, only an IR transistor 6 or magnetic reed switch 7 may be employed, or only an IR transistor 6 with a decoder, such that a predetermined sequence of IR pulses are required to activate power relay 20.

Figure 2:
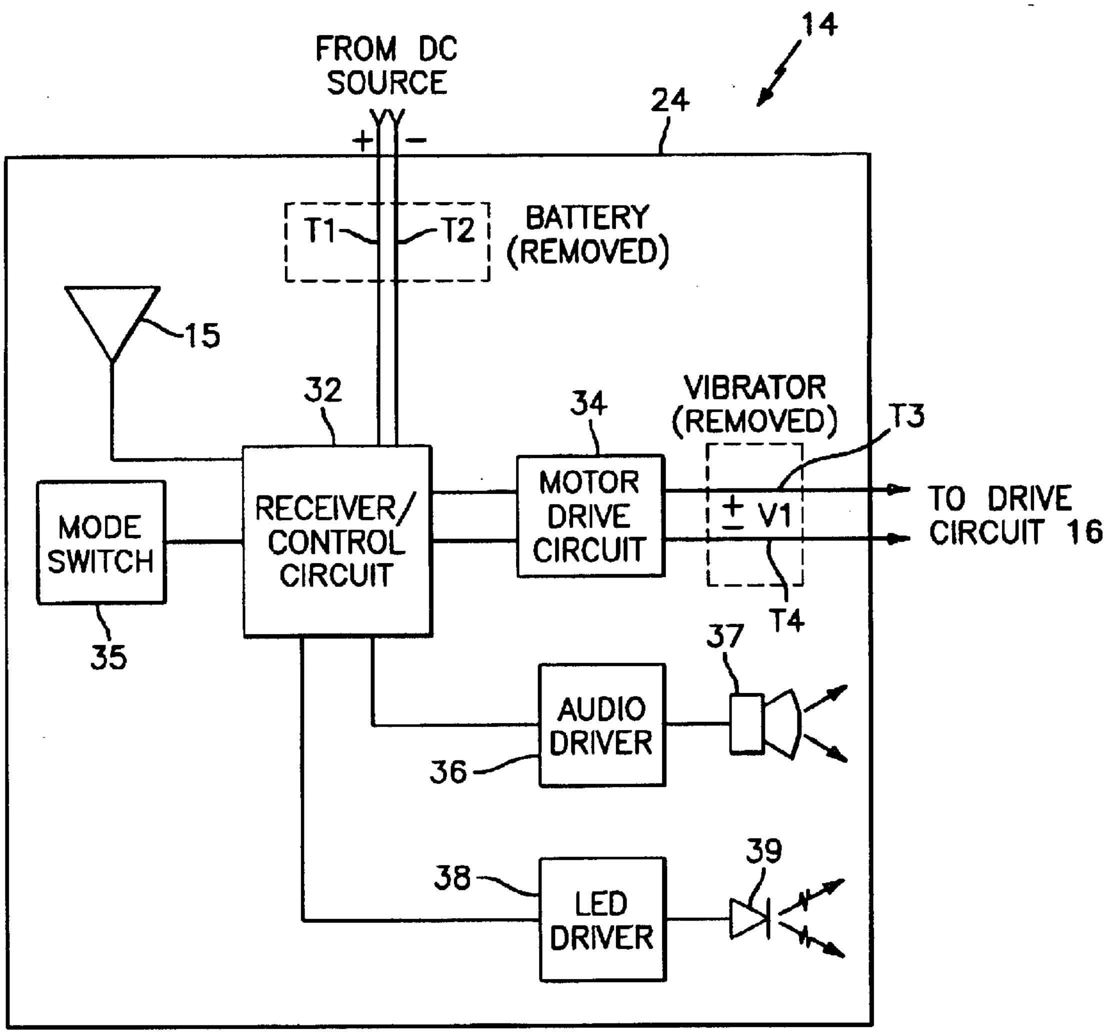
FIG. 2 is a block diagram of a conventional pocket pager configured to be utilized within the pager-based capacitor bank controller of the present invention.

With reference now to FIG. 2, a simplified block diagram of the conventional pocket pager 14*a* modified for use within the pager-based controller 10 is illustrated. Pocket pager 14*a* has the battery and vibrator removed and the battery contact points T1, T2 coupled to the DC power source 28 to receive the proper operating voltage for the electronics within the pager. A motor drive circuit 35 is coupled to the opto-isolator drive circuit 16 via connection at terminal points T3, T4 normally connected to the vibrator. A mode switch 35 is set to the vibrator position such that when a page is received by receiver/control circuit 32 via antenna 15, it responds by sending a command to motor drive circuit 34 rather than to the audio driver 36. Motor drive circuit 34 responds by outputting a voltage V1 of approximately 1.5 volts for a short duration. Pager 14*a* also includes LED driver 38, LED display 39 and audio transducer 37. These components are preferably not removed, since they can be used to verify reception of pages for testing purposes. It is noted that in alternative embodiments of the controller 10, it is possible to tap into the LED driver 38 and/or audio driver 36 (rather than or in addition to the motor drive circuit 34) to derive control signals for controlling the power relay switching state.

Furthermore, conventional pocket pagers are normally programmed by the pager company prior to delivery. A standard program used by the pager company requires the pager to give a reminder beep or vibration if the page is not acknowledged by pressing a button. The vibration is caused by a small motor with an unbalanced shaft which vibrates the pager. Since the pagers will be unattended, the typical pager programming needs to be modified to disable the reminder function.

Figure 3:
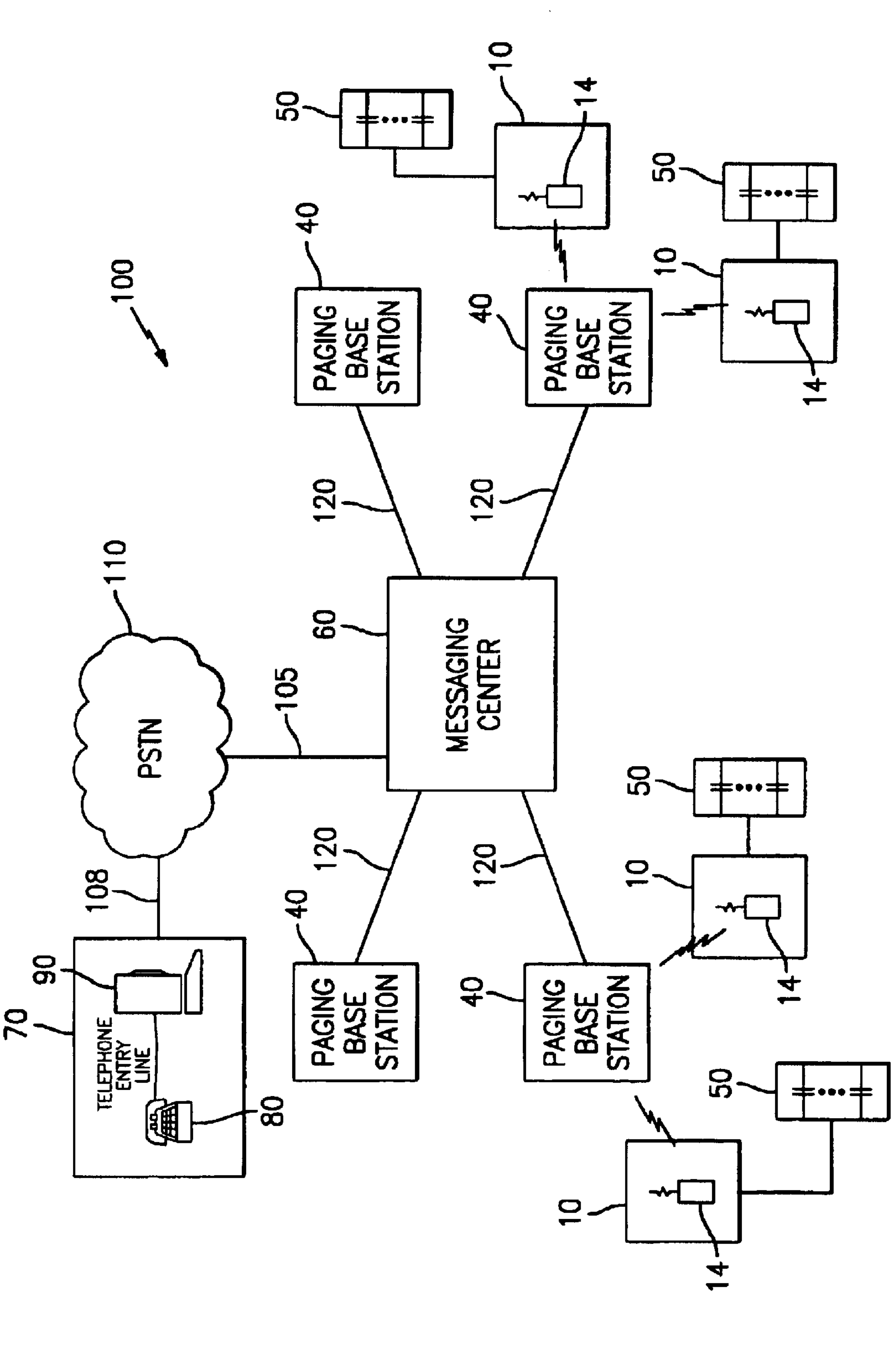
FIG. 3 is a block diagram of an illustrative remote control system including a pager network and multiple pager-based controllers of the present invention.

Referring now to FIG. 3, a remote control system 100 is illustrated which includes the pager-based controller 10 of the present invention. The system 100 controls the operational states of external electrical devices 50. System 100 includes a remote telecommunication terminal 70 which is connected to the PSTN 110 by a conventional telephone line 108. Terminal 70 can be as simple as a single telephone 80 operated by a human operator, or as complex as a fully automated computer 90 which maintains, inter alia, a memory of the operational state of each external electrical device. In the latter case, computer 90 automatically dials the pager numbers of pagers 14 within associated controllers 10 to dynamically switch specific external electrical devices 50 into and out of operation based on the desired result. For example, an electric generating station or capacitor bank may be switched in and out of service based on electric power requirements within a certain geographical area. When a page is initiated at terminal 70, the call is relayed through the PSTN 110 to a paging messaging center 60 via a wireline or wireless communication link 105. Messaging center 60 is coupled to each of a number of paging base stations 40 by means of wireline or wireless communication links 120. Typically, with one-way pager networks, each pager registered in the system can receive pages only within specific geographical regions associated with a particular one or more pager base stations 40. As such, when a call to a specific pager number is routed by the PSTN to messaging center 60, the messaging center relays the call to the particular base station 40 associated with that pager. Each associated base station 40 then transmits the page signal. In the exemplary system described herein, since the external electrical devices controlled by each controller 10 are typically at fixed locations, only a single base station 40 need transmit the specific page signal to change the switching state of the corresponding external electrical device 50. The pager within controller 10 receives the specific page signal and switches the relay state accordingly. (It is noted that in some pager networks, each pager base station may transmit all pages to every pager registered with the system. The exemplary system of this invention can operate with this type of pager network as well).

A security measure may be incorporated to prevent persons other than the responsible operator or computer system at terminal 70 from dialing the pager numbers and thus changing the states of capacitor banks. For example, a security/access code can be allocated by the pager network service provider to each pager 14*a*. Therefore, in order to communicate with the pager 14*a* in the pager system 100, the security/access code must be transmitted followed by the corresponding telephone number (or vice versa) for that particular pager 14*a*.

Thus disclosed is a pager-based remote control system and controller particularly useful for controlling switching states of electronic equipment. Advantageously, since conventional pocket pagers are used to receive RF paging signals through a paging network, there are minimal costs in setting up and maintaining the remote control system of the present disclosure. Further, customized transceiver circuitry and a radio network are not necessary to operate the pager-based controller 10 of the present disclosure.

It is to be understood that the embodiments described herein are merely exemplary and that one skilled in the art can make many modifications and variations to the disclosed embodiments without departing from the spirit or scope of the invention. For example, the present invention is not to be understood to be limited to employment in a pager system, but rather may be employed into numerous wireless communication systems, such as a Personal Communication Network (PCN) or into communication systems utilizing Personal and/or Terminal Mobility managers. According, all such modifications and variations are intended to be included within the scope and spirit of the present invention.

What is claimed is:

1. A system for controlling an on-off state of a remote electrical valve actuator, said system comprising:

a pager-based controller; and a terminal for transmitting a signal to the pager-based controller;

wherein the pager-based controller comprises a housing; at least one pager positioned within the housing and configured to receive the signal from a remote location, said at least one pager being further configured to provide an output to control the on-off state of the valve actuator; and a valve opening circuit operative to provide local control of the on-off state of the valve actuator, wherein the valve opening circuit is configured to change the on-off state of the valve actuator when an IR source and a magnetic source are brought into close proximity of the valve opening circuit.

2. The system recited in claim 1, wherein the valve opening circuit comprises an infra-red (IR) transistor and a magnetic reed switch connected in series.

3. The system recited in claim 1, wherein the pager-based controller further comprises a relay, the relay electrically connected and configured to receive the output from the at least one pager and supply a corresponding signal to the valve actuator.

4. The system recited in claim 1, wherein the terminal is one of a telephone or a computer.

5. A pager-based controller which comprises:

a housing;

at least one pager positioned within the housing and configured to receive a signal from a remote location, said at least one pager being further configured to provide an output to change an on-off state of a valve actuator; and a valve opening circuit positioned within the housing and operative to locally control the on-off state of the valve actuator, wherein the valve opening circuit is configured to change the on-off state of the valve actuator when an IR source and a magnetic source are brought into close proximity of the valve opening circuit.

6. The paper-based controller as recited in claim 5, further comprising:

a DC power source supplying DC power to the at least one pager, the valve opening circuit and the valve actuator.

7. The pager-based controller as recited in claim 5, further comprising a relay, the relay electrically connected and configured to receive the output from the at least one pager and supply a corresponding signal to the valve actuator.

8. The pager-based controller as recited in claim 5, wherein the valve opening circuit comprises an infra-red (IR) transistor and a magnetic reed switch connected in series.

9. The pager-based controller as recited in claim 5, further comprising an isolation circuit configured to electrically isolate the at least one pager and the valve opening circuit from at least one of a high voltage and a high current.

10. The pager-based controller as recited in claim 9, wherein the isolation circuit is an opto-isolator drive circuit.

11. The pager-based controller as recited in claim 5, wherein the output of the at least one pager is a voltage from a motor drive circuit within the at least one pager.

12. A method of remotely controlling a valve actuator comprising the steps of:

transmitting a first pager signal from a pager network to a pager-based controller located at a remote site, the pager-based controller having at least one pager therein;

outputting a first control signal from the at least one pager to change a switching state of a relay within the pager-based controller to thereby control an on-off state of the valve actuator which is electrically connected to the relay; and locally initiating, by bringing an IR source and a magnetic source within close proximity of the pager based controller, a second control signal to change the switching state of the relay within the controller.

13. The method recited in claim 12, wherein the second control signal changes the switching state of the relay within the controller to switch the on-off state of the valve actuator to a state which is opposite that which was caused by the first control signal.

14. The method recited in claim 12, wherein the step of transmitting a first pager signal is automatically initiated by a computer.

15. A gas system for controlling an on-off state of a remote electrical gas valve actuator, said gas system comprising:

a pager-based controller; and a terminal for transmitting a signal to the pager-based controller;

wherein the pager-based controller comprises a housing; at least one pager positioned within the housing and configured to receive the signal from a remote location, said at least one pager being further configured to provide an output to control the on-off state of the gas valve actuator; and a valve opening circuit operative to provide local control of the on-off state of the gas valve actuator, wherein the valve opening circuit is configured to change the on-off state of the valve actuator when an IR source and a magnetic source are brought into close proximity of the valve opening circuit.

16. The system recited in claim 15, wherein the valve opening circuit comprises an infra-red (IR) transistor and a magnetic reed switch connected in series.

17. The system recited in claim 15, wherein the pager-based controller further comprises a relay, the relay electrically connected and configured to receive the output from the at least one pager and supply a corresponding signal to the valve actuator.

18. The system recited in claim 15, wherein the terminal is one of a telephone or a computer.

19. The pager-based controller as recited in claim 15, further comprising an isolation circuit configured to electrically isolate the at least one pager and the valve opening circuit from at least one of a high voltage and a high current.

* * * * *